(12) United States Patent
Hidaka

(10) Patent No.: US 6,714,312 B1
(45) Date of Patent: Mar. 30, 2004

(54) IMAGE PROCESSING SYSTEM

(75) Inventor: Atomu Hidaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/218,144

(22) Filed: Dec. 22, 1998

(30) Foreign Application Priority Data

Dec. 26, 1997 (JP) ............................................. 9-359084

(51) Int. Cl.⁷ .......................... G06K 15/00; H04N 1/40; H04N 1/32
(52) U.S. Cl. ........................ 358/1.15; 358/448; 358/468
(58) Field of Search ................................ 358/448, 442, 358/1.15, 1.9, 400, 468; 379/100.05, 100.06, 100.12, 102.02

(56) References Cited

U.S. PATENT DOCUMENTS

| | | | | |
|---|---|---|---|---|
| 4,204,249 A | * | 5/1980 | Dye ............................ | 364/200 |
| 4,706,126 A | * | 11/1987 | Kondo ........................ | 358/257 |
| 4,817,091 A | * | 3/1989 | Katzman ....................... | 371/9 |
| 5,023,832 A | * | 6/1991 | Fulcher ....................... | 364/900 |
| 5,826,035 A | * | 10/1998 | Hamada et al. ......... | 395/200.77 |
| 5,872,569 A | * | 2/1999 | Salgado ..................... | 345/349 |
| 5,935,250 A | * | 8/1999 | Shimizu ....................... | 713/201 |
| 6,005,590 A | * | 12/1999 | Negishi et al. ............. | 345/505 |
| 6,038,628 A | * | 3/2000 | Leung ......................... | 710/126 |
| 6,092,088 A | * | 7/2000 | Takeda ......................... | 707/500 |
| 6,307,981 B1 | * | 10/2001 | Kamei ......................... | 382/309 |

FOREIGN PATENT DOCUMENTS

| | | | | |
|---|---|---|---|---|
| JP | 6-202998 | 7/1994 | ........... | G06F/15/16 |
| JP | 6-276374 | 9/1994 | ........... | H04N/1/21 |
| JP | 6-100850 | 12/1994 | .......... | G03G/15/00 |
| JP | 7-111564 | 4/1995 | ........... | G03B/27/50 |

\* cited by examiner

*Primary Examiner*—Jerome Grant, II
(74) *Attorney, Agent, or Firm*—Finnegan, Henderson, Farabow, Garrett & Dunner LLP

(57) ABSTRACT

An image processing system comprises a plurality of image processing modules respectively including a peculiar processing section for executing image processing peculiar to respective image processing module, a high speed bus for connecting between the plural image processing modules, the high speed bus having a command response procedure, and a common processing section for executing image processing common to the plural image processing modules, the common processing section provided in at least one module of the plural image processing modules and shared by the plural image processing modules to execute required image processing.

19 Claims, 14 Drawing Sheets

| MODULE NO. | MODULE NAME | DEVICE NO. | ATTRIBUTE | CONTENTS | DEVICE NAME | TYPE | STATE |
|---|---|---|---|---|---|---|---|
| 1 | COPY | 1 | SYSTEM | SYSTEM | SYS-CTL | COMMON | NORMAL |
| 1 | COPY | 2 | SYSTEM | USER I/F PANEL | SYS-PNL | COMMON | NORMAL |
| 1 | COPY | 11 | DISK | HARD DISK 1 | IDE-HDD1 | COMMON | NORMAL |
| 1 | COPY | 21 | EXT. COMMUN. | SERIAL 1 | EXT-COM1 | EXCLUSIVE | NORMAL |
| 1 | COPY | 50 | PRINTER | LASER PRINTER 1 | PRT-LBP1 | EXCLUSIVE | NORMAL |
| 1 | COPY | 51 | SCANNER | SCANNER 1 | SCN-SCN1 | EXCLUSIVE | NORMAL |
| 2 | PRINTER | 1 | SYSTEM | SYSTEM | SYS-CTL | COMMON | NORMAL |
| 2 | PRINTER | 2 | SYSTEM | USER I/F PANEL | SYS-PNL | COMMON | NORMAL |
| 2 | PRINTER | 11 | DISK | HARD DISK 1 | SCSI-HDD1 | COMMON | NORMAL |
| 2 | PRINTER | 21 | EXT. COMMUN. | SERIAL 1 | EXT-COM1 | EXCLUSIVE | NORMAL |
| 2 | PRINTER | 23 | EXT. COMMUN. | PARALLEL 1 | EXT-LPT1 | EXCLUSIVE | NORMAL |
| 2 | PRINTER | 30 | NET. COMMUN. | EITHRNET COMMUN. (ROW) | NET-ROW1 | COMMON | NORMAL |
| 2 | PRINTER | 40 | COMMUN. SERVICE | COMMUN. SERVICE CONTROL | NET-CTL1 | COMMON | NORMAL |
| 2 | PRINTER | 41 | COMMUN. SERVICE | NETWARE | NET-NW1 | COMMON | NORMAL |
| 2 | PRINTER | 42 | COMMUN. SERVICE | TCP/IP | NET-TCP1 | COMMON | NORMAL |
| 2 | PRINTER | 50 | SERVICE | SERVICE CONTROL | APL-CTL | COMMON | NORMAL |
| 2 | PRINTER | 51 | SERVICE | PRINT | APL-PRT | EXCLUSIVE | NORMAL |
| 2 | PRINTER | 52 | SERVICE | FONT | APL-FONT | COMMON | NORMAL |
| 2 | PRINTER | 53 | SERVICE | NONSTANDARD CHARACTER | APL-LOGO | EXCLUSIVE | NORMAL |
| 2 | PRINTER | 54 | SERVICE | ELECTRONIC SORTING | APL-SORT | EXCLUSIVE | NORMAL |
| 2 | PRINTER | 55 | SERVICE | COLOR CONVERSION TABLE | APL-CLR | EXCLUSIVE | NORMAL |
| 3 | SCANNER | 1 | SYSTEM | SYSTEM | SYS-CTL | COMMON | NORMAL |
| 3 | SCANNER | 5 | DISK | HARD DISK 1 | IDE-HDD1 | COMMON | NORMAL |
| 3 | SCANNER | 7 | EXT. COMMUN. | SERIAL 1 | EXT-COM1 | EXCLUSIVE | NORMAL |
| 3 | SCANNER | 8 | EXT. COMMUN. | MODEM 1 | EXT-MDM1 | EXCLUSIVE | NORMAL |
| 3 | SCANNER | 50 | SERVICE | SERVICE CONTROL | APL-CTL | COMMON | NORMAL |
| 3 | SCANNER | 51 | SERVICE | DATA SAVING | APL-PCOL | COMMON | NORMAL |
| 3 | SCANNER | 52 | SERVICE | SCANNING | APL-SCN | COMMON | NORMAL |
| 2 | PRINTER | 53 | SERVICE | COLOR CONVERSION TABLE | APL-CLR | EXCLUSIVE | NORMAL |
| 3 | SCANNER | 54 | SERVICE | FAX TRANSMITTAL | APL-FAX | COMMON | NORMAL |

FIG. 13

IMAGE PROCESSING SYSTEM

BACKGROUND OF THE INVENTION

The present invention relates to an image processing system, specifically relates to an image processing system which can be freely configured such that an image processor provided with an optimum function corresponding to a situation of utilization by a user by mutually connecting plural image processing modules respectively provided with a peculiar image processing section for executing peculiar image processing via a high speed bus provided with a command response procedure.

Generally, a related image processor is configured as a device provided with a fixed function proposed by a manufacturer.

For example, a copying machine is configured based upon a copying function and some copying machines are configured so that some functions can be added as an option, however, most of the functions which can be added are related to the copying function such as an automatic manuscript carrying function and an automatic collecting function.

A facsimile is also configured based upon a facsimile function and some facsimiles to which a copying function is added exist, however in this case, the copying function is realized utilizing an image reading function and an image output function with which a facsimile is essentially provided and performance with which a user is satisfied cannot be desired, compared with a normal copying machine.

A printer is also configured based upon a printing function and some printers are configured so that optional functions related to the printing function can be added, however, there are few printers to which functions except the printing function are added.

A so-called hybrid machine in which a copying machine and a facsimile are integrated or a printer is integrated with the above machine is also proposed.

However, also in the above hybrid machine, as its manufacturer presets available functions, an image processor provided with an optimum function corresponding to a situation of utilization by a user cannot be freely configured.

Particularly, in a recent image processor, the processing of color images is important, however, if there is tried that the configuration of a hybrid machine such as can sufficiently meet a copying function, a facsimile function and a printing function in which the processing of color images is enabled, the cost of the whole machine is very high and is not practical, a user buys a machine provided with an unnecessary function and it is very uneconomical.

SUMMARY OF THE INVENTION

The object of the present invention is to provide an image processing system which can be freely configured such that an image forming apparatus provided with an optimum function corresponding to a situation of utilization by a user.

In order to achieve the object, there is provided an image processing system comprising: a plurality of image processing modules respectively including a peculiar processing section for executing image processing peculiar to respective image processing module; a high speed bus for connecting between the plural image processing modules, the high speed bus having a command response procedure; and a common processing section for executing image processing common to the plural image processing modules, the common processing section provided in at least one module of the plural image processing modules and shared by the plural image processing modules to execute required image processing.

Each of the plural image processing module collects module information of any other modules connected thereto via the high speed bus to generate a connection management table when the system is started up, and when each of the plural image processing modules requests any other modules to execute processing, the module to be requested is determined with reference to the connection management table generated therein.

The module information may include device information of a device connected to associated image processing module.

When respective module information in each of the plural image processing modules is altered, the altered module information is informed to any other modules via the high speed bus, and each of the image processing modules informed of the alteration of the module information updates automatically the connection management table therein based on the altered module information.

The plural image processing modules include at least two modules of: a first image processing module for applying required image processing to image information input from an image information input device to output an image corresponding to the processed image information from an image information output device; a second image processing module for applying required image processing to image information input from an external line to output an image corresponding to the processed image information from an image information output device; and a third image processing module for applying required image processing to image information input from an image information input device to transfer the processed image information to an external line.

The first image processing module includes an exclusive image transfer bus for applying required image processing to image information input from an image information input device to output an image corresponding to the processed image information from an image information output device.

The common processing section is provided in the first image processing module when the plural image processing module include the first image processing module.

The external line connected to the second image processing module is connected with at least one of an external equipment and a network.

The external line connected to the third image processing module is connected with at least one of an external equipment and a facsimile line.

The image processing system can be constituted without providing the common processing section therein.

BRIEF DESCRIPTION OF THE DRAWINGS

In the accompanying drawings:

FIG. 13 shows an example of a connection management table generated by processing shown in FIG. 12.

DETAILED DESCRIPTION OF THE PREFERRED EMBODIMENTS

Referring to the accompanying drawings, embodiments of an image processor and its expansion method according to the present invention will be described in detail below.

Figure 1:
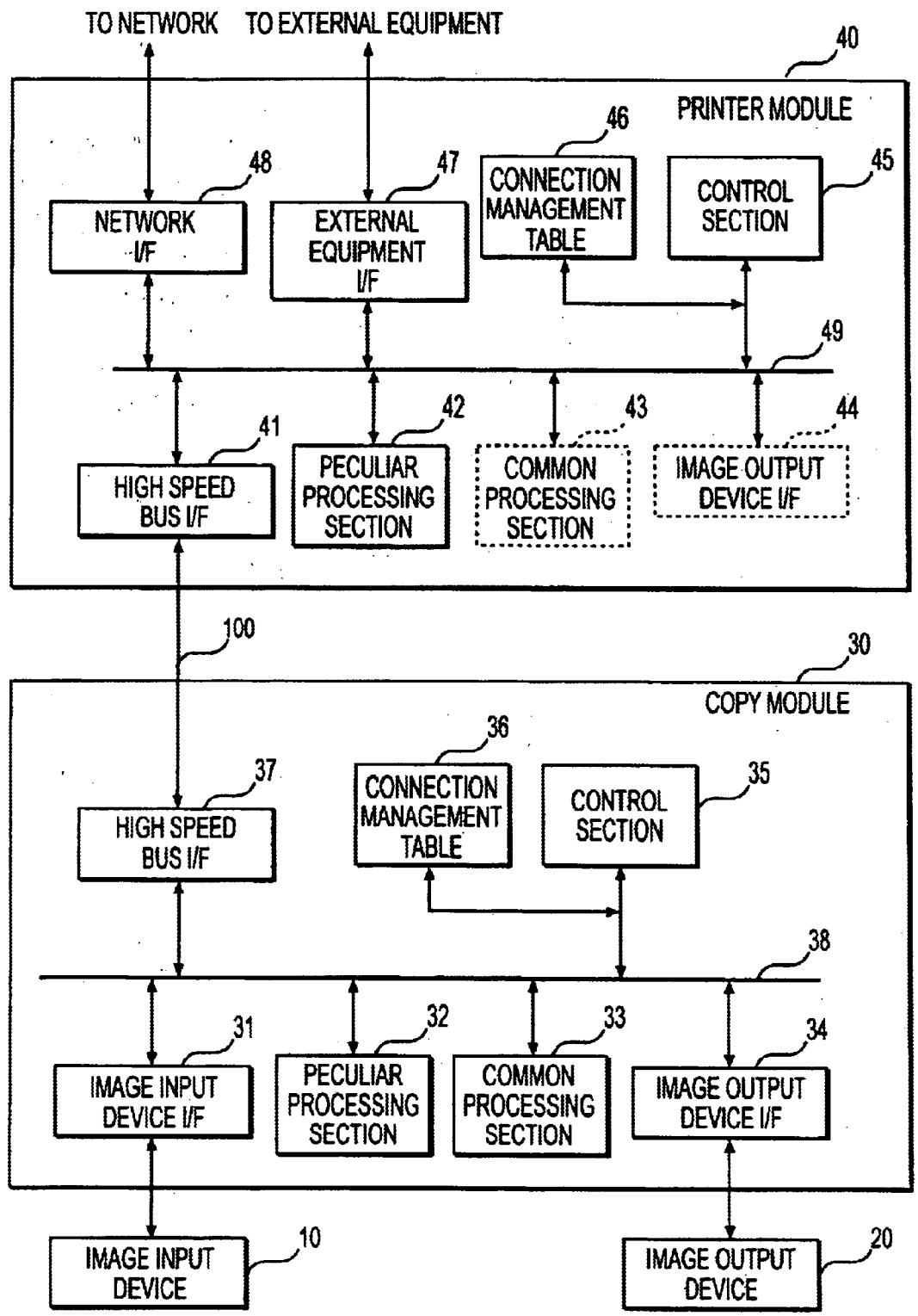
FIG. 1 is a block diagram showing a first embodiment of an image processing system according to the present invention.

FIG. 1 is a block diagram showing a first embodiment of an image processing system according to the present invention.

As shown in FIG. 1, the image processing system is constituted by connecting a printer module 40 connected to a network or external equipment (respectively not shown) via a high speed bus 100 to a copy module 30 to which an image input device 10 and an image output device 20 are connected and hereby, the hybrid operation of copying operation and printing operation are realized.

Copying operation means operation for outputting image information input from the image input device 10 from the image output device 20 as a hard copy, and printing operation means operation for outputting images based upon image information transferred via a network or from external equipment from the image output device 20 as a hard copy.

As shown in FIG. 1, the copy module 30 is provided with an image input device interface 31, a peculiar processing section 32, a common processing section 33, an image output device interface 34, a control section 35, a connection management table 36, a high speed bus interface 37 and a system bus 38, and the printer module 40 is provided with a high speed bus interface 41, a peculiar processing section 42, a common processing section 43, an image output device interface 44, a control section 45, a connection management table 46, an external equipment interface 47, a network interface 48 and a system bus 49.

The image input device interface 31 of the copy module 30 controls an interface with the image input device 10 and the image output device interface 34 controls an interface with the image output device 20.

As the image output device interface 44 of the printer module 40 is not used in the configuration shown in FIG. 1, the image output device interface 44 can be omitted in the printer module 40 shown in FIG. 1.

The high speed bus interface 37 of the copy module 30 and the high speed bus interface 41 of the printer module 40 respectively control an interface with the high speed bus 100.

The high speed bus 100 is a full-duplex line via which data can be transferred at high speed and it is desirable that the high speed bus has the data transfer performance of 100 Mbit/sec. or more.

For the high speed bus 100, existing technique for connection such as an IEEE-1934 bus, Ultra-Wide SCSI, a fiber channel, a peripheral component interconnect (PCI) bus, a 100BASE-T switching local are network (LAN), an automatic teller's machine (ATM) and Gigabit-Ethernet can be utilized.

The copy module 30 and the printer module 40 are connected via the high speed bus 100 between command response interfaces described in detail later and defined in the present invention, that is, the high speed bus interface 37 and the high speed bus interface 41 and are constituted so that the copy module 30 can utilize a network and external equipments respectively connected to the printer module 40 and the printer module 40 can utilize the image output device connected to the copy module 30.

The external equipment interface 47 of the printer module 40 controls an interface with the external equipment connected to the printer module 40 and the network interface 48 controls an interface with a network connected to the printer module 40.

The peculiar processing section 32 of the copy module 30 executes peculiar image processing of the copy module 30 and the peculiar processing section 42 executes peculiar image processing of the printer module 40.

The common processing section 33 of the copy module 30 and the common processing section 43 of the printer module 40 respectively execute the common processing of the copy module 30 and the printer module 40.

As the common processing section 33 of the copy module 30 and the common processing section 43 of the printer module 40 similarly function, the common processing section 43 of the printer module 40 for example can be omitted as shown in FIG. 1.

In this case, the common processing section 33 of the copy module 30 is shared by the copy module 30 and the printer module 40.

The control section 35 of the copy module 30 controls the whole operation of the copy module 30 and the control section 45 of the printer module 40 controls the whole operation of the printer module 40.

The connection management table 36 of the copy module 30 stores and manages the module information of another module connected to the copy module 30, that is, the printer module 40 in the configuration shown in FIG. 1 and the device information of devices connected to the printer module 40.

The connection management table 46 of the printer module 40 stores and manages the module information of another module connected to the printer module 40, that is, the copy module 30 in the configuration shown in FIG. 1 and the device information of devices connected to the copy module 30.

The connection management tables 36 and 46 are generated in the initialization of the high speed bus 100 when the system is started up as described in detail later, are automatically updated based upon information broadcast from a newly connected module when connected modules vary and are always referred when communication is made via the high speed bus 100 between the copy module 30 and the printer module 40.

In the configuration shown in FIG. 1, in the copy module 30, a peculiar transfer path in which image information input from the image input device 10 is directly transferred to the image output device 20 via the image input device interface 31, the peculiar processing section 32, the common processing section 33 and the image output device interface 34 is formed in addition to processing via the system bus 38.

Owing to the existence of the peculiar transfer path of the copy module 30, in the copy module 30, copying operation can be also executed without damaging the original functions of the copy module 30 in the configuration shown in FIG. 1 in which the printer module 40 is connected. Further, arranging a common processing section in the copy module 30 as the common processing section 33, a high speed printout can be achieved by utilizing the peculiar transfer path which is the shortest way.

The copy module 30 shown in FIG. 1 controls a copying function for forming an image by a laser printer and others which are the image output device 20 and outputting it on output paper after reading a manuscript input from the image input device 10 and executing processing for scaling up or down an image on the manuscript if necessary.

The outline of the copy module 30 is as follows:
1) Filtering processing optimal for copying can be applied to a manuscript at a step of inputting the manuscript. In the filtering processing, the input manuscript is discriminated by automatic manuscript recognition or according to an instruction from a user is provided to a step at which a manuscript is input.
2) The copy module is constituted so that after the input of a manuscript is started, input data is immediately read, a laser printer (the image output device) is started up and processing for outputting the input data, converting the data to an output format is executed and hereby, high speed output provided with the high quality of images is enabled. That is, latency time from the input of a manuscript to the output of a first copy can be reduced and the mean copy output time can be reduced.
3) There is provided an input manuscript recognizing function for preventing an unjust bill and unjust securities from being forged.
4) An electronic sorting and output function is available by connecting a hard disk and an electronic sorter for executing high speed image data compressing/expanding processing as an optional function.

The printer module 40 also provides a local printing function for transferring image data to a laser printer which is the image output device connected to the copy module 30, forming images by the laser printer and outputting them on output paper after receiving print data (image information) from external equipment such as a computer directly connected to the printer module 40 via the external equipment interface 47 which is a parallel interface and executing processing for scaling up/down and rotating an image (image information) on a manuscript if necessary, and a network printing function for transferring image data to the laser printer which is the image output device connected to the copy module 30, forming images by the laser printer and outputting them on output paper after receiving print data from a computer connected to the printer module 40 via a LAN line, others and the network interface 48 and executing processing for scaling up/down and rotating an image on a manuscript if necessary.

The outline of the printer module 40 is as follows:
1) Received print data is processed at high speed and is converted to bit map information for outputting from a printer by drawing a character using stored fonts and vector data.
2) Print data can be received from a parallel interface (the external equipment interface 47) which is an external equipment interface, a LAN interface (the network interface 48) and the high speed bus 100.
3) Both the dedicated interface for connection and the high speed bus can be utilized to output data to the image output device 20.
4) A dedicated image processing section for converting the format, the resolution, the color space and the number of colors of received data at high speed is provided as an optional function.
5) There is provided a color control mechanism for converting the hue of an image to a hue the most suitable for a connected printer and converting the hue of an image to a hue specified by a user when the color space and the number of colors are converted.
6) An electronic sorting and output function is available by connecting a hard disk and an electronic sorter composed of a high speed image data compressing/expanding processing section as an optional function.

Next, referring to FIGS. 2 to 4, the details of the peculiar processing section 32 and the common processing section 33 of the copy module 30 and the peculiar processing section 42 of the printer module respectively shown in FIG. 1 will be described.

Figure 2:
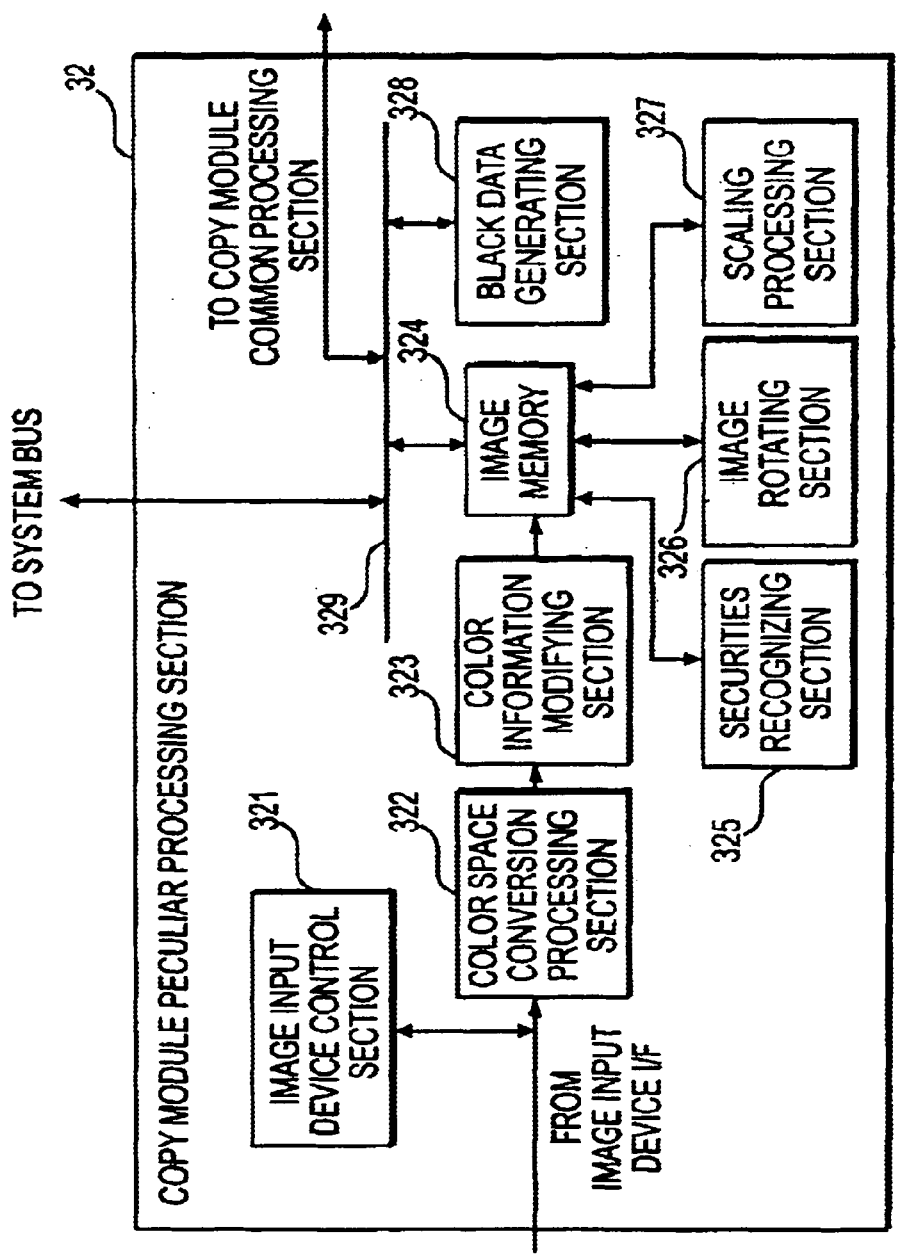
FIG. 2 is a block diagram showing the details of a peculiar processing section of a copy module shown in FIG. 1.

FIG. 2 is a block diagram showing the details of the peculiar processing section of the copy module shown in FIG. 1.

As shown in FIG. 2, the peculiar processing section 32 of the copy module 30 is connected to the image input device interface 31 to execute processing proper to the copy module 30, and is provided with an image input device control section 321 for controlling the image input processing of the image input device 10, a color space converting processing section 322 for executing the color space conversion processing of image information output from the image input device interface 31, a color information modifying section 323 for executing predetermined color information modifying processing for image information to which the color space conversion processing is applied in the color space conversion processing section 322, an image memory 324 for storing image information to which the color information modifying processing is applied in the color information modifying section 323, a securities recognizing section 325 for recognizing whether or not the above image information is securities information for which copying is prohibited based upon image information stored in the image memory 324, an image rotating section 326 for applying required image rotating processing to the image information stored in the image memory 324, a scaling section 327 for applying required image scaling processing to the image information stored in the image memory 324, an internal bus 329 connected to the image memory 324 and connected to the system bus 38 of the copy module 30 and a black data generating section 328 connected to the internal bus 329 for generating the data of black based upon the image information when image information stored in the image memory 324 is transferred to the common processing section 33 of the copy module 30.

Figure 3:
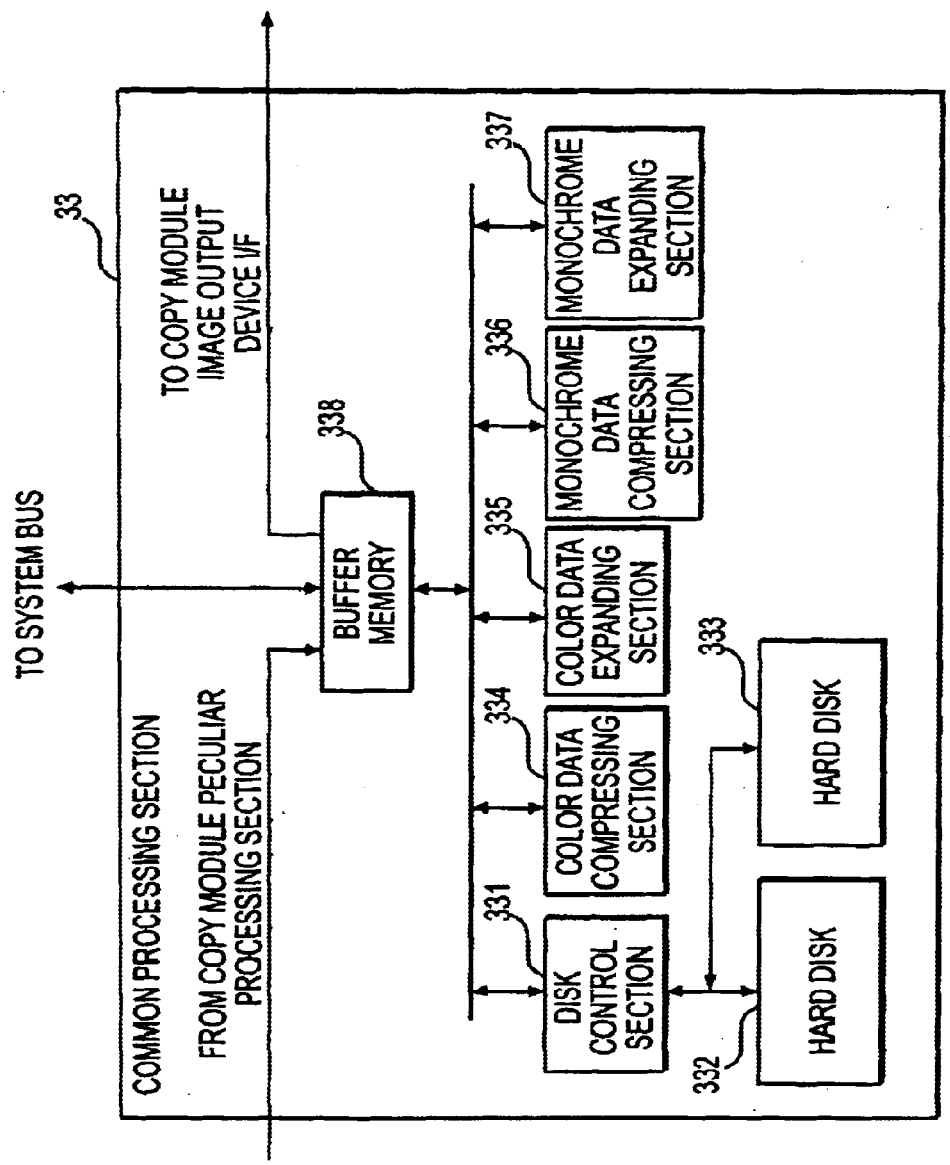
FIG. 3 is a block diagram showing the details of a common processing section of the copy module shown in FIG. 1.

FIG. 3 is a block diagram showing the details of the common processing section of the copy module shown in FIG. 1.

As shown in FIG. 3, the common processing section 33 of the copy module 30 executes processing common to the copy module 30 and the printer module 40 respectively shown in FIG. 1.

The common processing section 33 is configured by connecting a disk control section 331, a color data compressing section 334, a color data expanding section 335, a monochrome data compressing section 336, a monochrome data expanding section 337 and a buffer memory 338 to an internal bus 339.

The disk control section 331 controls two hard disks 332 and 333 for storing image data.

Also, the color data compressing section 334 executes processing for compressing color image data and the color data expanding section 335 executes processing for expanding color compressed image data.

Also, the monochrome data compressing section 336 executes processing for compressing monochrome image data and the monochrome data expanding section 337 executes processing for expanding monochrome compressed image data.

Also, the buffer memory 338 temporarily stores image information input from the peculiar processing section 32 of the copy module 30 or via the system bus 38 and temporarily stores image information output to the image output device interface 34.

As described above, the common processing section 33 is configured by each section for compressing/expanding a color image/a monochrome image (the color data compressing section 334, the color data expanding section 335, the monochrome data compressing section 336 and the monochrome data expanding section 337), the disk control section 331 and a mass storage represented by a hard disk (the hard disks 332 and 333).

Functions provided by the common processing section 33 are as follows:

1) Temporary Storage and Sorting of Output Image Data:

When input image data is printed out using a copying function in which order, the number of copies and double-sided output processing are specified, once input manuscript image data is compressed, is temporarily stored on the hard disk 332 or 333, is read from it in desired order and can be printed out to the image output device 20.

For example, if images on a manuscript input in the order of 1-2-3-4 are output by two copies, image data can be output in order such as 1-1-2-2-3-3-4-4, 1-2-3-4-1-2-3-4, 4-4-3-3-2-2-1-1 and 4-3-2-1-4-3-2-1.

The processing is also similar in case images are printed out as the function of a printer, in case received images are printed out when facsimile is received or in case the destination of output is not a printer but a network communications line.

2) Temporary Storage of Input Image Data:

The common processing section 33 can be used for temporarily storing received print image data and facsimile data, as a confidential post-office box from which data can be output only by specification by a user, for converting the format of large quantity of image data and for a temporarily stored area in color information modifying processing by compressing input manuscript image data or image data received from a network communications line, temporarily storing it on the hard disk and reading it at arbitrary times as in the above input data storage procedure.

Figure 4:
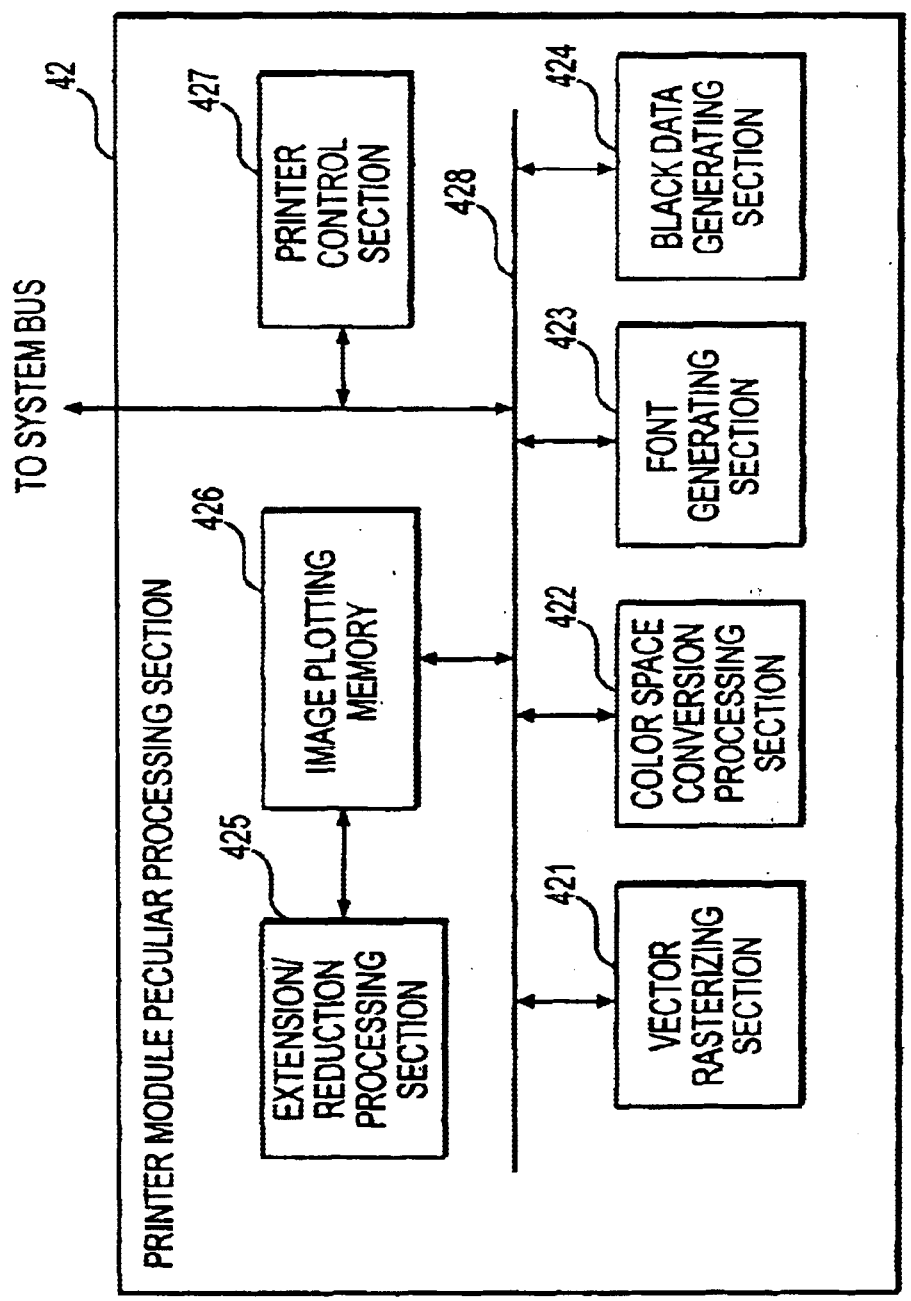
FIG. 4 is a block diagram showing the details of a peculiar processing section of a printer module shown in FIG. 1.

FIG. 4 is a block diagram showing the details of the peculiar processing section of the printer module shown in FIG. 1.

As shown in FIG. 4, the peculiar processing section 42 of the printer module 40 executes processing proper to the printer module 40, is configured by connecting a vector rasterizing section 421, a color space conversion processing section 422, a font generating section 423, a black data generating section 424 and an image drawing memory 426 to an internal bus 428, a scaling section 425 for executing required image scaling processing for image data stored in the image drawing memory 426 is connected to the image drawing memory 426, the internal bus 428 is connected to the system bus 429 of the printer module 40 and a printer control section 427 for controlling processing as a printer by the printer module 40 is connected to the internal bus.

The vector rasterizing section 421 converts the vector data of image information received via a network or from external equipment to the raster data, the color space conversion processing section 422 executes color space conversion processing fitted to the color space of the image output device 20 for outputting image information received via a network or from external equipment, the font generating section 423 generates font information when code information received via a network or from external equipment is plotted in the image drawing memory 426 and the black data generating section 424 generates the data of black to emphasize the data of black in image information plotted in the image drawing memory 426.

The common processing section 43 of the printer module 40 shown in FIG. 1 is similar to the common processing section 33 of the copy module 30 shown in FIG. 3 except that the common processing section 43 is not connected to the peculiar processing section 42 and the image output device interface 44.

The copy module 30 shown in FIG. 1 can be operated as a copying machine by itself if the image input device 10 and the image output device 20 are connected to the copy module, and the printer module 40 can be operated as a printer by itself if the image output device 20 is connected to the printer module.

Figure 5:
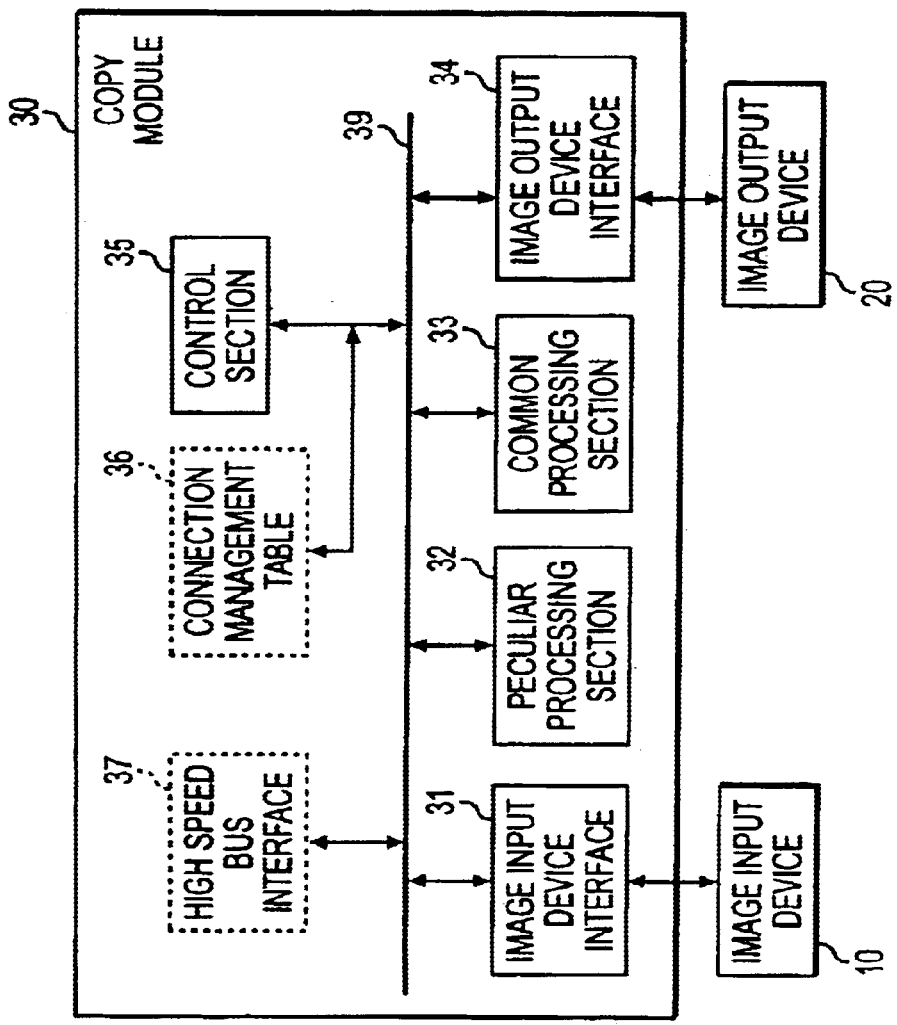
FIG. 5 is a block diagram showing a unitary copying machine configured by connecting an image input device and an image output device to the copy module shown in FIG. 1.

FIG. 5 is a block diagram showing a unitary copying machine configured by connecting the image input device and the image output device to the copy module shown in FIG. 1.

In the configuration shown in FIG. 5, the copying machine is operated as a copying machine for outputting image information input from the image input device 10 from the image output device 20 as a hard copy by directly transferring image information input from the image input device 10 to the image output device 20 via the image input device interface 31, the peculiar processing section 32, the common processing section 33 and the image output device interface 34.

As the connection management table 36 and the high speed bus interface 37 are not used in the configuration shown in FIG. 5, the connection management table 36 and the high speed bus interface 37 may be also omitted in the copy module 30 shown in FIG. 5.

Figure 6:
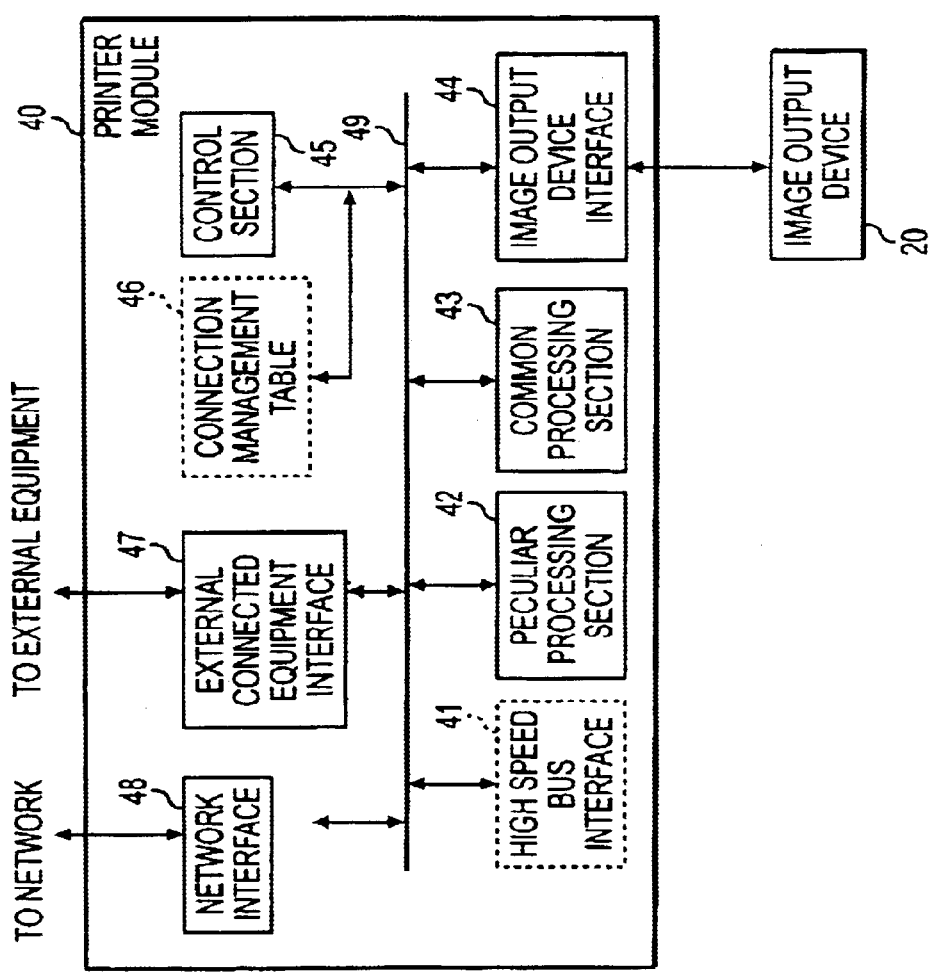
FIG. 6 is a block diagram showing a unitary printer configured by connecting the image output device to the printer module shown in FIG. 1.

FIG. 6 is a block diagram showing a unitary printer configured by connecting the image output device to the printer module shown in FIG. 1.

In the configuration shown in FIG. 6, the printer is operated as a printer for outputting images based upon image information transferred via a network or from external equipment from the image output device 20 as a hard copy.

As the connection management table 46 and the high speed bus interface 41 are not used in the configuration shown in FIG. 6, the connection management table 46 and the high speed bus interface 41 may be also omitted in the printer module 40 shown in FIG. 6.

Figure 7:
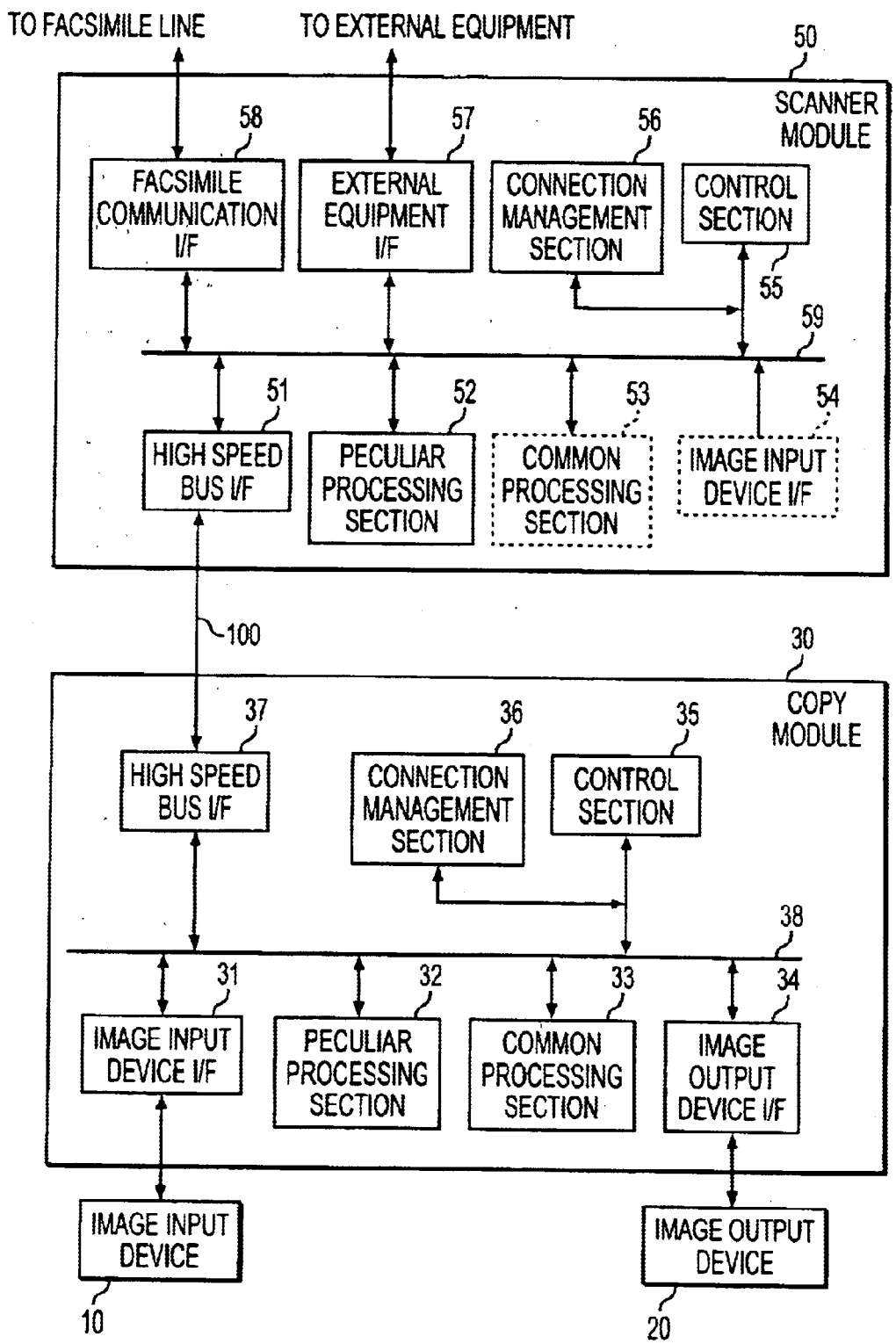
FIG. 7 is a block diagram showing another embodiment of the image processing system according to the present invention.

FIG. 7 is a block diagram showing another embodiment of the image processing system according to the present invention.

As shown in FIG. 7, an image processing system realizes the hybrid operation of copying operation and the scanning operation by connecting a facsimile line (not shown) and a scanner module 50 connected to external equipment to a copy module 30 to which an image input device 10 and an image output device 20 are connected via a high speed bus 100.

The copying operation means operation for outputting image information input from the image input device 10 from the image output device 20 as a hard copy as described above, and the scanning operation means operation for transferring image information based upon image information input from the image input device 10 to a facsimile line or external equipment.

The copy module 30 is composed of an image input device interface 31, a peculiar processing section 32, a common processing section 33, an image output device interface 34, a control section 35, a connection management table 36, a high speed bus interface 37 and a system bus 38 as described above and the scanner module 50 is composed of a high speed bus interface 51, a peculiar processing section 52, a common processing section 53, an image output device interface 54, a control section 55, a connection management table 56, an external equipment interface 57, a facsimile communications interface 58 and a system bus 59.

The image input device interface 54 of the scanner module 50 controls an interface with the image input device 10 and as the image input device interface 54 is not used in the configuration shown in FIG. 7, the image input device interface 54 may be also omitted in the scanner module 50 shown in FIG. 7.

The high speed bus interface 51 of the scanner module 50 controls an interface with the high speed bus 100, the external equipment interface 57 of the scanner module 50 controls an interface with the external equipment connected to the scanner module 50 and the facsimile communications interface 58 of the scanner module 50 controls an interface with a facsimile line connected to the scanner module 50.

The peculiar processing section 52 of the scanner module 50 executes image processing peculiar to the scanner module 50, the common processing section 53 of the scanner module 50 executes processing common to the copy module 30 and the scanner module 50 and in the configuration shown in FIG. 7, the common processing section 43 for example may be also omitted in the scanner module 50.

In this case, the common processing section 33 of the copy module 30 is shared by the copy module 30 and the scanner module 50.

The control section 55 of the scanner module 50 controls the whole operation of the scanner module 50, and the module information of another module connected to the scanner module 50, that is, the copy module 30 and the device information of devices connected to the copy module 30 in the connection management table 56 in the configuration shown in FIG. 7 are stored and managed in the connection management table 56.

In the configuration shown in FIG. 7, the copy module 30 is composed of the same components as the copy module 30 shown in FIG. 1 and the description is omitted.

The scanner module 50 provides a local scanner function for transferring images on a manuscript input from the image input device 10 to a computer and others which are external equipment directly connected to the scanner module 50 via the external equipment interface 57 such as SCSI after executing processing for scaling up/down or rotating the images on the manuscript if necessary, and a network scanner function for transferring images on a manuscript input from the image input device 10 to a computer connected to the scanner module 50 via a LAN line, others and a network interface not shown after executing processing for scaling up/down or rotating the images on the manuscript if necessary.

The outline of the scanner module 50 is as follows:

1) Manuscript image data input from the manuscript input device 10 as color digital information in three primary colors is processed at high speed, the hue of input images such as gamma (contrast), brightness, saturation, hue and sharpness is corrected and data is output to external equipment via an external equipment interface (SCSI) at high speed.

2) Data can be transferred via the high speed bus 100 which is an interface between modules in addition to the external equipment interface.

3) Both a dedicated interface and the high speed bus are available to control the operation of the manuscript input device 10 and input data.

4) Functions for increasing the number of colors of input manuscript images, inputting at higher resolution and subtly adjusting resolution and hue are provided by having a function for controlling the operation of the manuscript input device 10 in detail, compared with that in the copy module 30.

5) A function for temporarily storing input image data and a function for converting the format of large quantity of input image data are available as an optional function by connecting a hard disk and an image data processing section for executing processing for compressing/expanding image data at high speed.

6) A data communication facility with a facsimile line is available as an optional function by connecting a facsimile.

Figure 8:
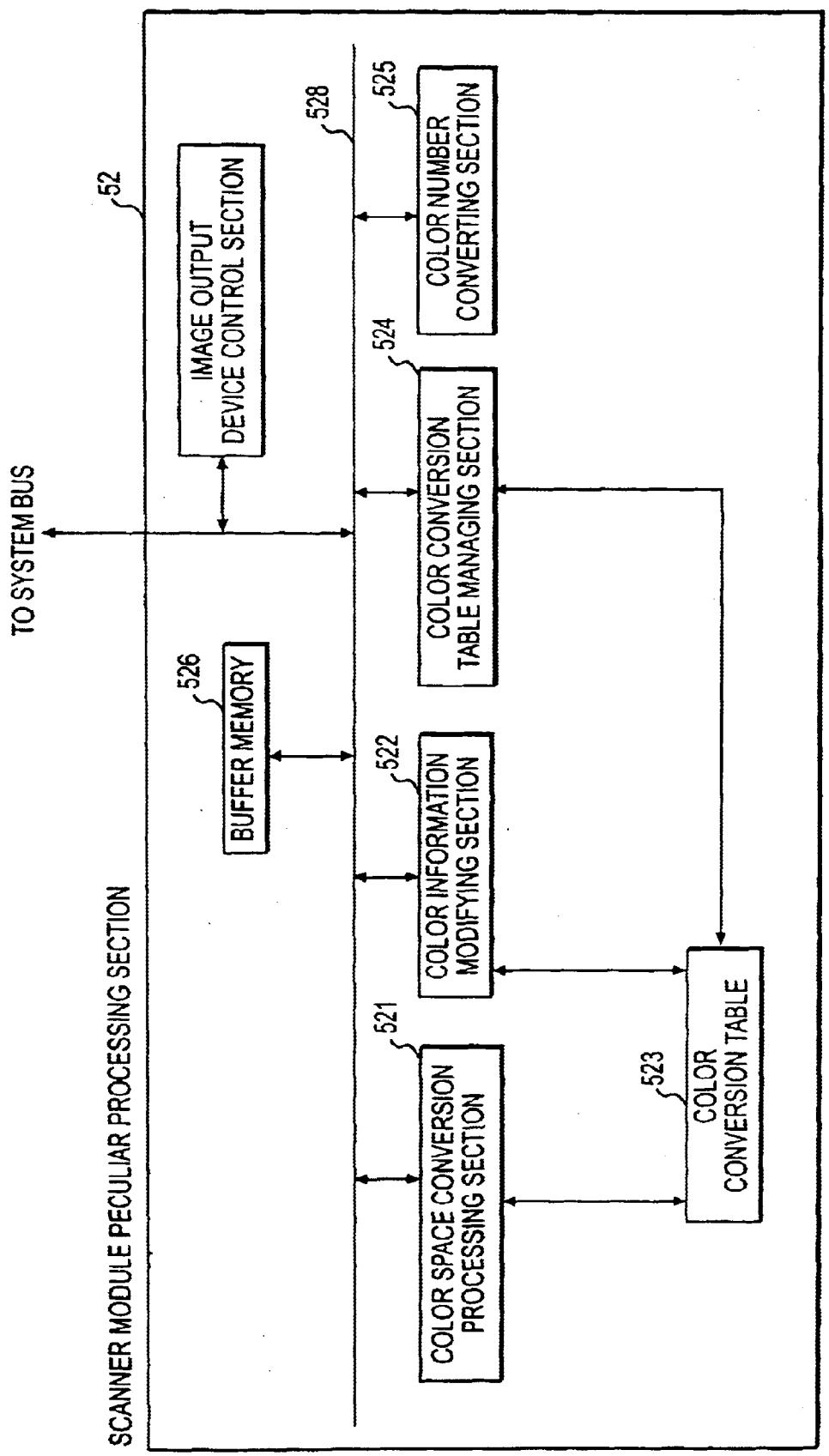
FIG. 8 is a block diagram showing the details of a peculiar processing section of a scanner module shown in FIG. 7.

FIG. 8 is a block diagram showing the details of the peculiar processing section of the scanner module shown in FIG. 7.

As shown in FIG. 8, the peculiar processing section 52 of the scanner module 50 executes processing proper to the scanner module 50, is configured by connecting a color space conversion processing section 521, a color information modifying section 522, a color conversion table managing section 524, a color number converting section 525 and a buffer memory 526 to an internal bus 528. The internal bus 528 is connected to the system bus 59 of the scanner module 50 and a scanner control section 527 for controlling scanning processing by the scanner module 50 is connected to the internal bus.

The color conversion table 523 managed by the color conversion table managing section 524 is connected to the color space conversion processing section 521 and the color information modifying section 522. The color space conversion processing section 521 applies the color space conversion processing to the image information which is fetched from the image input device 10 by scanning processing of the scanner control section 527 and stored in the buffer memory 526 with reference to the color conversion table 523. The color information modifying section 522 applies color information modification to the image information which is fetched from the image input device 10 by scanning processing of the scanner control section 527 and stored in the buffer memory 526 with reference to the color conversion table 523.

Also, the color number converting section 525 executes the color number conversion of image information which is fetched from the image input device 10 by scanning processing of the scanner control section 527 and stored in the buffer memory 526.

The common processing section 53 of the scanner module 50 shown in FIG. 7 is similar to the common processing section 33 of the copy module 30 shown in FIG. 3 except that the common processing section 53 is not connected to the peculiar processing section 52 and the image input device interface 54.

The scanner module 50 shown in FIG. 7 can be operated unitarily as a scanner if the image input device 10 is connected.

Figure 9:
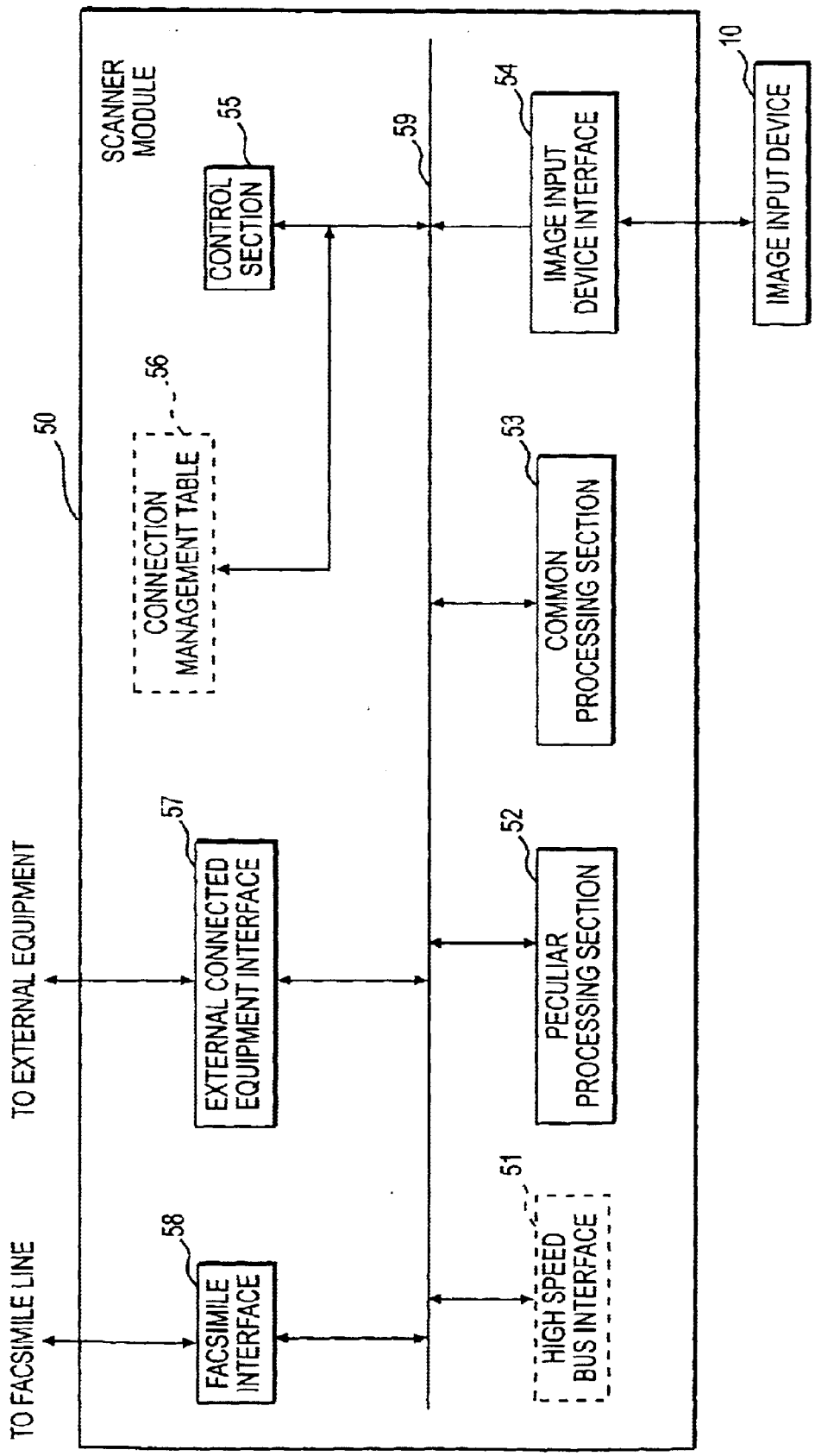
FIG. 9 is a block diagram showing a unitary scanner configured by connecting an image output device to the scanner module shown in FIG. 7.

FIG. 9 is a block diagram showing a unitary scanner configured by connecting the image output device to the scanner module shown in FIG. 7.

In the configuration shown in FIG. 9, the scanner is operated as a scanner for transferring image information based upon image information input from the image input device 10 to a facsimile line and external equipment.

As the connection management table 56 and the high speed bus interface 51 are not used in the configuration shown in FIG. 9, the connection management table 56 and the high speed bus interface 51 may be also omitted in the scanner module 50 in the configuration shown in FIG. 9.

Figure 10:
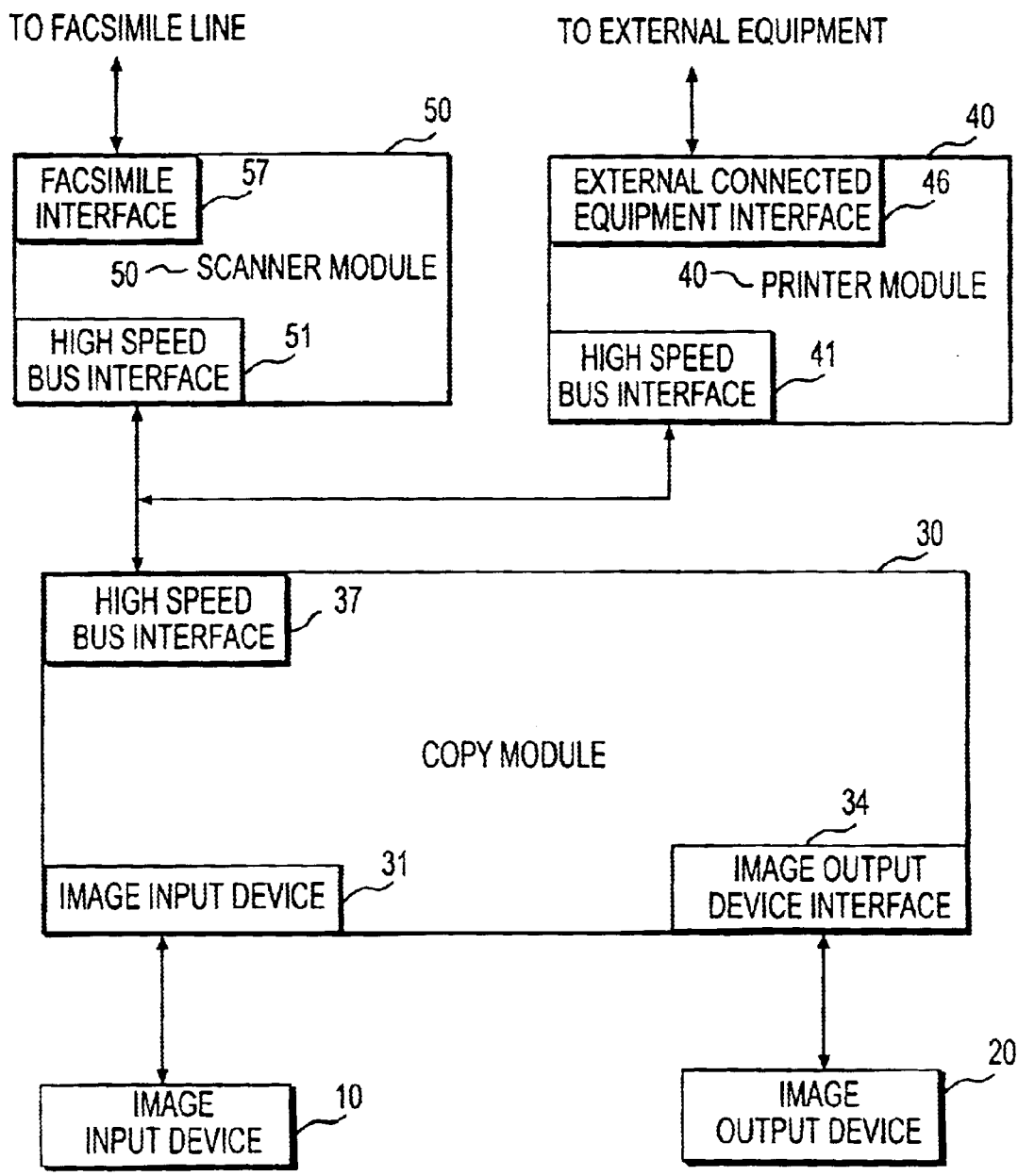
FIG. 10 is a block diagram showing still another embodiment of the image processing system according to the present invention.

FIG. 10 is a block diagram showing still another embodiment of the image processing system according to the present invention.

As shown in FIG. 10, an image processing system realizes the hybrid operation of copying operation, printing operation and scanning operation by connecting a printer module 40 connected to external equipment (not shown) and a scanner module 50 connected to a facsimile line (not shown) to a copy module 30 to which an image input device 10 and an image output device 20 are connected respectively via a high speed bus 100.

According to such configuration, the following operations an be executed:

1) copying operation for outputting image information input from the image input device 10 from the image output device 20 as a hard copy;
2) printing operation for outputting image information transferred from external equipment from the image output device 20 via the copy module 30 as a hard copy; and
3) scanning operation for transferring image information input from the image input device 10 to a facsimile line via the scanner module 50.

As described above, in the image processing system in these embodiments, since each of the function components of the system is respectively provided as a module, all of the each function can be provided in the identical hardware or software, and easily extensible system can be provided.

Each module is configured by connecting a network interface, an external equipment interface, a high speed bus interface, a dedicated image input device interface, a dedicated image output device interface, a peculiar processing section and a common processing section to a system bus.

Supposing a user owns the printer shown in FIG. 6 at first, by adding the copy module and the scanner module later, the function of the printer can be easily extended so as to be provided as a system having the functions of the printer, scanner and the copying machine.

At the time, the common processing section arranged in one of the printer module and the scanner module should be reduced and rearranged in the copy module. Thereby maximum performance of a digital copying machine is available at a lower cost because the peculiar path in the copy module can be utilized at the time of copying operation as described above.

In the above image processing system, the following operation is executed when the high speed bus 100 is started up:

1) connecting the high speed bus and interchanging information;
2) suspending the connection if an error is detected;
3) acquiring information of the destination of connection;
4) referring a connection management table is referred.
5) verifying a connected device and a related device driver;
6) loading and preparing the device driver if an increase of connected devices is detected; and
7) updating the connection management table.

Figure 11:
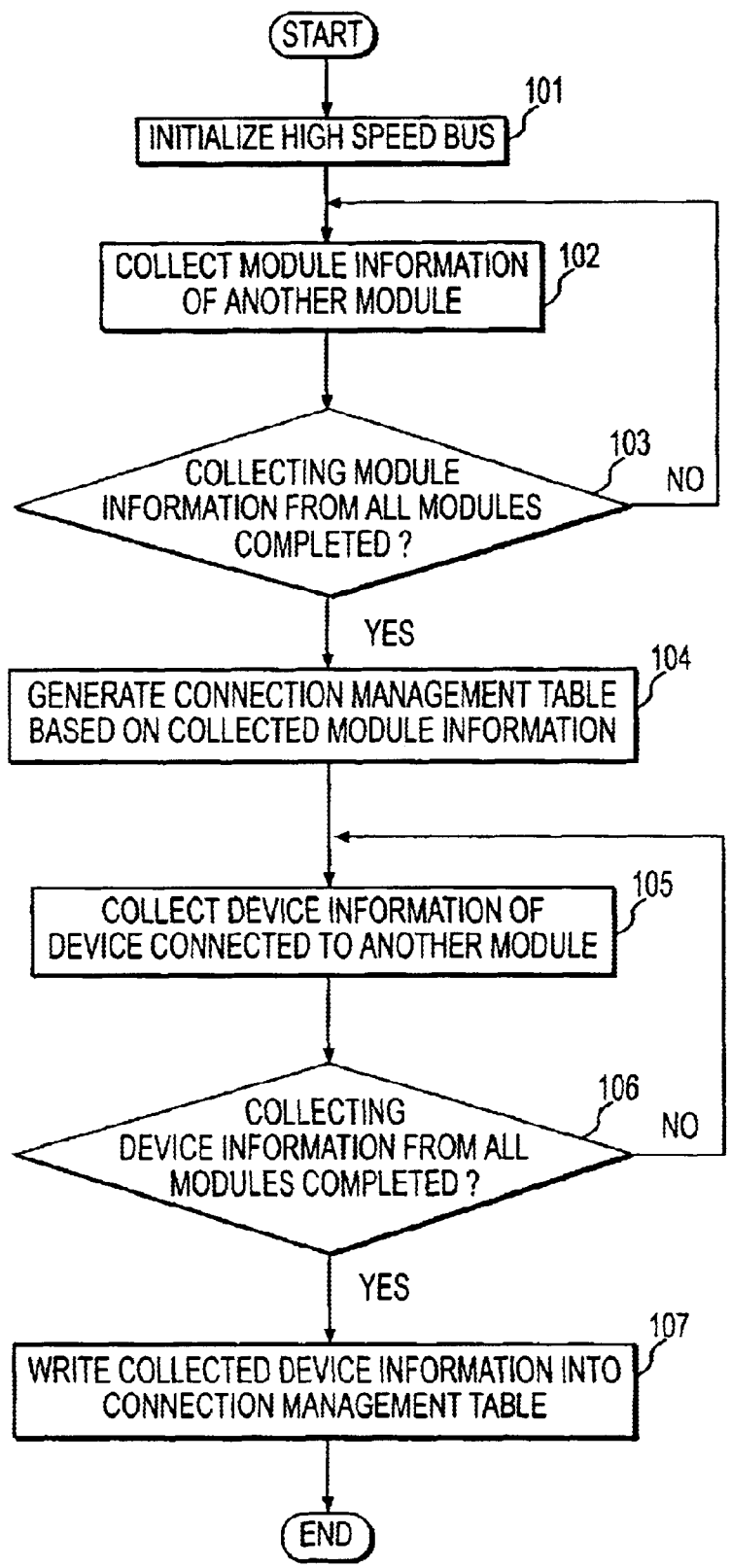
FIG. 11 is a flowchart showing startup processing of the image processing system according to the present invention.

FIG. 11 is a flowchart showing processing when the system is started up in the image processing system according to the present invention.

As shown in FIG. 11, when a power source is turned on in each module, a high speed bus is initialized in a step 101 and the module number of each module is defined. The module number of each module is determined by automatically allocating order to each high speed bus interface in the initialization of the high speed bus.

Next, the module information of another module connected to a module is collected in a step 102. That is, each module mutually sends a packet for collecting the module information of another module and inquires information related to another module connected the high speed bus. Each module which receives the inquiry sends the module information of its own module to a module which quires in the data format of a packet for informing of the module formation of its own module.

Each module checks whether the collection of module information from all the modules connected to its own module by collecting module information is completed or not in a step 103, if the collection of module information is not completed (NO in the step 103), processing is returned to the step 102 and it is awaited that the collection of module information is completed by continuing the collection, however, when predetermined time elapses and it is determined in the step 103 that the collection of the module information of all the modules is completed (YES in the step 103), a connection management table showing a list of another module connected to a module is generated based upon the above collected module information in a step 104.

Next, device information related to devices connected to another module connected to a module is collected in a step 105. The device information is collected by inquiring of another module connected to the module based upon the connection management table generated in the step 104.

That is, inquired each module sends the device information of devices connected to its own module to an inquiring module.

The inquiring module checks whether or not the collection of device information from all modules managed based upon the connection management table is completed in a step 106, if the above collection is not completed (NO in the step 106), processing is returned to the step 105 and the collection of device information is continued, when it is determined in the step 106 that the collection of device information is completed (YES in the step 106), the collected device information is written to the connection management table in a step 107 and processing executed when the system is started up is finished.

The above processing is executed every module and when the generation of a connection management table and processing for writing device information are finished in all modules, preparation for each module to utilize another module connected thereto via a high speed bus is completed.

Figure 12:
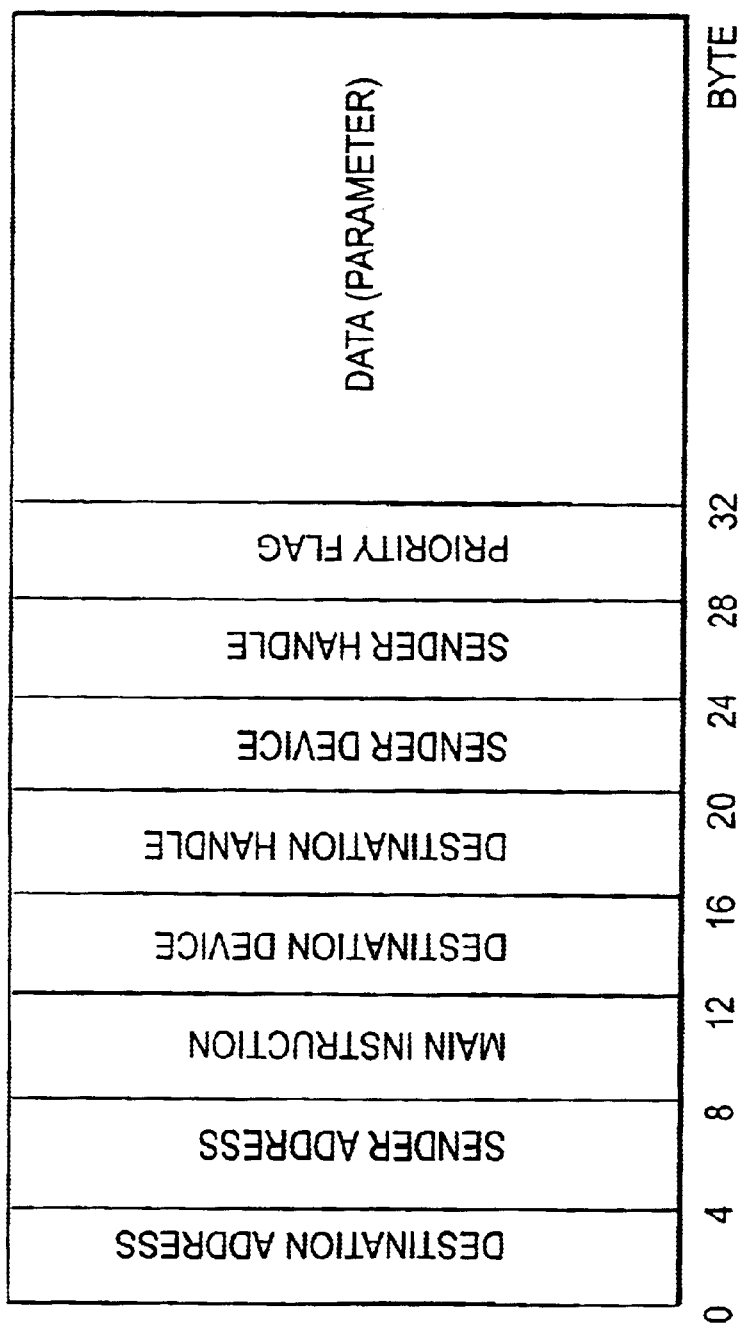
FIG. 12 is a format chart showing an example of a packet used for transmitting information between the modules in the image processing system according to the present invention.

FIG. 12 is a format chart showing an example of a packet used for transmitting information between modules in the image processing system according to the present invention.

As shown in FIG. 12, the format of a packet used for transmitting information between modules is composed of:
1) a destination address part;
2) a sender address part;
3) a main instruction part;
4) a destination device part;
5) a destination handle part;
6) a sender device part;
7) a sender handle part;
8) a priority flag part; and
9) a data (parameter) part.

An address for specifying the destination module of a packet is stored in the destination address part and if the address of the destination is "−1", it means a broadcast to all modules.

An address showing a module which is the sender of a packet is stored in the sender address part. A main instruction showing the meaning of the packet is stored in the main instruction part.

A device number meaning a destination device which is the destination of a packet is stored in the destination device part. A destination handle number showing an identification number allocated from the destination device is stored in the destination handle part to communicate with the destination device. Plural application software can share one device owing to the destination handle. If the destination handle is first used, "0" is specified.

The device number of a sender is stored in the sender device part and the handle number of the sender is stored in the sender handle part. For the handle number of a sender, a sender freely specifies a handle from which the sender desires to receive an answer.

If a device cannot be utilized for the inquiry from another module, "−1" is specified.

Order for the packet to be processed and a priority flag for specifying the meaning of data are stored in the priority flag part.

The priority flag includes:
"0": management information including an error on a high speed bus, a test or the like;
"1": emergency;
"2" to "9": priority (a smaller number is higher);
"−1": normal end of data during communication;
"−2": abnormal end of data during communication (the contents of data are guaranteed till transferred data); and
"−3": abnormality of data processing during communication (it is not guaranteed whether the contents of data are correct or not).

Transferred data or a parameter for supplementing an instruction in the case of an instruction is stored in the data (parameter) part.

FIG. 13 shows an example of a connection management table generated by the processing shown in FIG. 11.

As shown in FIG. 13, the connection management table is provided with the items of "module number" which is the number of each module, "module name" showing the name of each module, "device number" showing the number of devices connected to each module, "attribute" showing the attribute of each module, "contents" showing the contents of each module, "device name" showing the name of the devices connected to each module, "type" showing the type of each module and "state" showing the state of each module.

Figure 14:
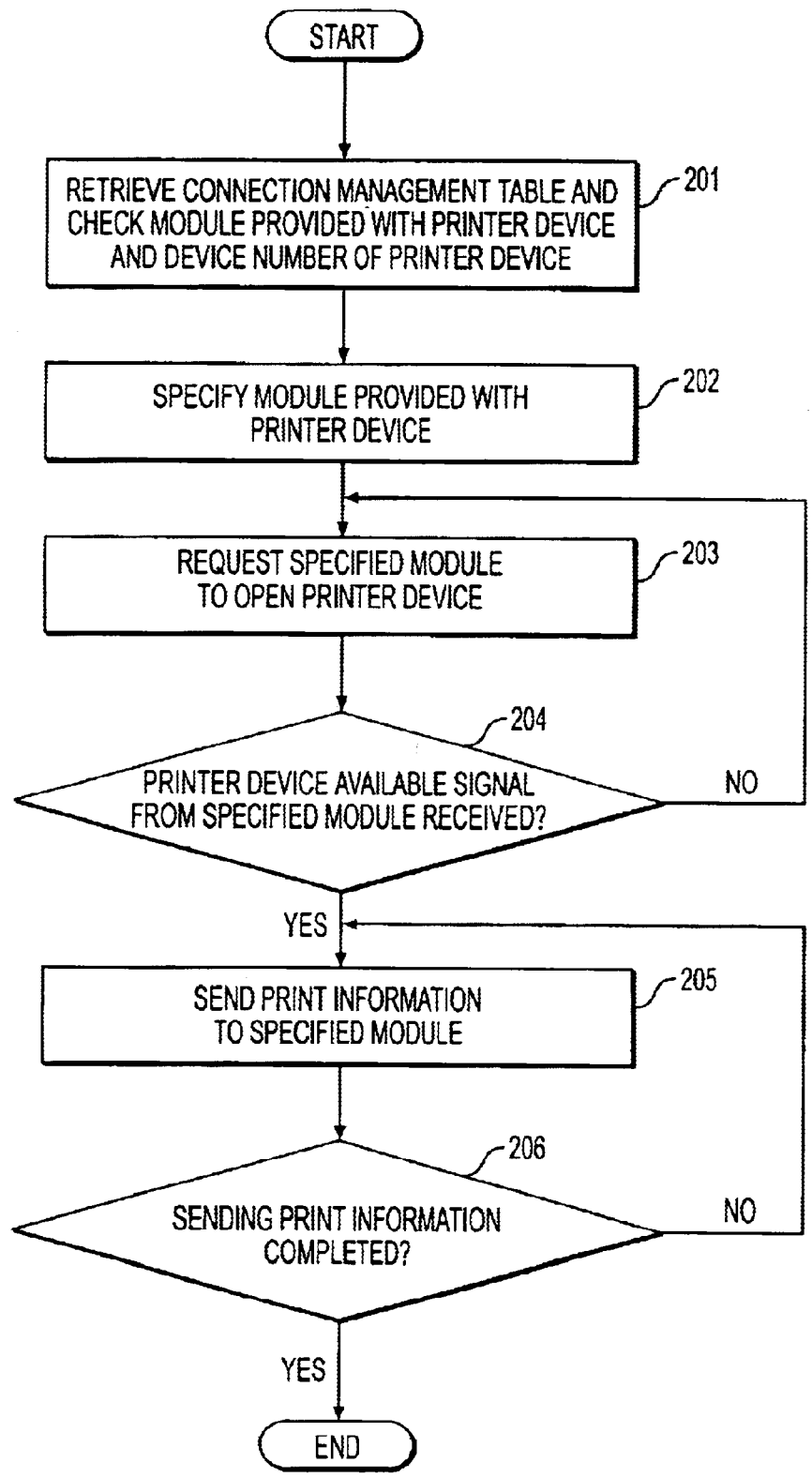
FIG. 14 is a flowchart showing processing in case output from application software running on a printer module to a printer device managed by a copy module is executed in the image processing system according to the present invention.

FIG. 14 is a flowchart showing processing in case output from application software running on a printer module to a printer device controlled by a copy module is executed in the image processing system according to the present invention configured as shown in FIG. 1 for example.

As shown in FIG. 14, if output from the application software run on the printer module 40 to the printer device (the image output device 20) controlled by the copy module 30 is executed, first, the connection management table 46 on the printer module 40 is retrieved, and a module having the attribute of the printer device and the device number of the printer device are checked in a step 201.

Next, a module provided with a printer device for outputting print data is specified in a step 202.

As multiple modules can be connected via the high speed bus 100 in the image processing system according to the present invention, a case that plural modules having the attribute of the printer device are found is also estimated, however, in that case, one device to be output from is required to be determined by specifying using other conditions.

Next, a packet requesting the printer device to be opened is sent to the specified module so as to request the printer device to be output from to be opened in a step 203.

That is, the printer module 40 specifies an output (WRITE) mode and sends a packet requesting the copy module 30 to open the device. The copy module 30 which receives the packet checks whether or not the connected printer device is currently available. If the connected printer device is available, the printer device is locked because the printer device is an exclusive control unit which cannot be simultaneously utilized by plural applications. Then the copy module 30 allocates the sender handle number internally and replies a device available signal to the requesting printer module.

If the printer device is already being used by another and is not available, the sender handle number is changed to "−1" and an unavailable signal is returned to the requesting module.

The printer module 40 checks whether or not there is received a device available signal is sent from the specified module, that is, the copy module 30 in a step 204. If the above signal is not received (NO in the step 204), processing is returned to the step 203 and awaits until a device available signal is received. If it is determined in the step 204 that a device available signal is received, that is, if the printer module 40 can normally acquire a handle number (YES in the step 204), a data packet is formatted based upon sent print information and is sent to the specified module, that is, the printer device (the image output device 20) of the copy module 30 using the acquired handle number in a step 205.

Next, it is checked in a step 206 whether or not the sending of print information is completed. If the sending is not completed (NO in the step 206), processing is returned to the step 205 and the sending of the print information is continued. When it is determined in the step 206 that the sending of print information is completed (YES in the step 206), the processing is terminated.

To further explain the details of the above processing, the copy module 30 which receives the above data packet checks if necessary whether or not the printer device to be connected can output and then answers to the requesting printer module 40. If the printer device cannot output for any reason, information showing that output is disabled is sent to the requesting printer module 40.

If the printer module 40 justly acquires alteration for an output start request, the data packet is formatted again and output data is sent to the printer device of the copy module 30.

The copy module 30 which receives the data packet transfers and outputs received data to the connected printer device. If output is disabled for any reason, the effect is sent to the printer module 40.

A priority flag at the end of output data sent from the printer module 40 is set to "−1" and termination is informed.

If information is output to the printer device again after termination is informed from the printer module 40, the above procedure is repeated from the sending operation.

If the termination of the utilization of the printer device by the printer module 40 is informed, a packet showing a CLOSE is formatted and sent to the printer device of the copy module 30.

The copy module which receives the CLOSE packet releases the internal locking set to control the printer device, formats and sends a packet meaning a normal end.

In the above description, there is shown an example that information is output to the printer device, however, a device provided by another module may be also software or service in which software and hardware are integrated. This is called a virtual device. Service provided by the virtual device is shown as service in the field of "attribute" in the connection management table shown in FIG. 13.

If data can be input or output, many functions which each module can provide another module can be disclosed as a virtual device and each module can utilize functions executed by a program stored in another module by utilizing these functions.

In the image processing system according to the present invention, there is provided a procedure for dynamically changing a device supporting another module.

That is, if a system management software stored in one module recognizes cases as follows during normal operation after an initial procedure after a power source is turned on, it changes service information for another module stored therein: in case a new device in case a new service which can be utilized by another module is added to one module; in case a device function which can be utilized by another module is deleted from one module; and service is halted.

At the time, the module in which the service information therein is changed specifies "emergency" for the priority flag of a packet, sends the packet and informs any other module connected to a high speed bus.

Each module which receives the information inquires of the module which sent the information to acquire the information of a device connected thereto.

The module which receives the inquiry sends the latest information of devices connected thereto to each of the modules which sent the inquiry.

The device information is written into a connection management table managed by each module based upon the acquired device information. When the inquiry from any module which receives the information of change and writing to each connection management table are finished, processing for updating devices connected to each module is completed in each module.

In the image processing system in the above embodiment, if a module is newly connected, it is configured that the configuration of the system is automatically grasped after addition or when the system is started up, required software is read according to the configuration, and then automatically stored in each module. Hereby, the functions can be extended without changing software, the running software is common and the operability of a user is enhanced.

As each module is configured by the same hardware and the same software as those built inside a scanner and a printer when a common processing section is removed from each module and the modules are configured as an extension module, the same function, performance, hardware and software are acquired in case a digital copying machine is first introduced and a scanner extended module is introduced as an extension module, in case a scanner is first introduced and a copying extended module is introduced as an extension module and in case a copying machine and a scanner are introduced from first.

As each module which functions as a digital copying machine, a scanner and a printer is composed of hardware and software in which the peculiar functions and performance can be optimized, the functions and performance of each module which functions as a digital copying machine, a scanner and a printer can be optimized even after the functions are extended. These functions and performance are never inferior, compared with a digital copying machine, a scanner and a printer respectively provided with conventional type internal configuration.

As has been described heretofore, according to the present invention, an information processing system is configured as follows. Plural image processing modules respectively provided with a peculiar image processing section for executing peculiar image processing are configured so that the plural image processing modules are mutually connected via a high speed bus provided with a command response procedure. A common processing section for executing image processing common to the plural image processing modules is provided to at least one of the plural image processing modules. The common processing section is shared by the plural image processing modules to execute required image processing. Each information processing module mutually collects the module information of another image processing module connected thereto via the high speed bus and respectively generates a connection management table therein. When one image processing module asks another image processing module to execute some processing via the high speed bus, it determines the another image processing module to be asked to execute processing with reference to the connection management table. According to the above configuration, an image forming apparatus provided with an optimum function corresponding to a situation of utilization by a user can be freely configured.

What is claimed is:

1. An image processing system comprising:
 a plurality of image processing modules, wherein each image processing module includes a peculiar processing section for executing image processing peculiar to the image processing module;
 a high speed bus for connecting between the plurality of image processing modules, the high speed bus having a command response procedure; and a common processing section for executing image processing common to the plurality of image processing modules, the common processing section provided in at least one of the plurality of image processing modules and shared by the plurality of image processing modules to execute required image processing,
wherein the common processing section and the peculiar processing sections are provided separately.

2. The image processing system as set forth in claim 1, wherein:
each of the plurality of image processing modules collects module information of any other module connected to the module collecting the module information via the high speed bus to generate a connection management table when the system is started up, and
when each of the plurality of image processing modules requests any other module to execute processing, the module to be requested is determined with reference to the connection management table generated therein.

3. The image processing system as set forth in claim 2, wherein when respective module information in each of the plural image processing modules is altered, the altered module information is informed to any other modules via the high speed bus, and
each of the image processing modules informed of the alteration of the module information updates automatically the connection management table therein based on the altered module information.

4. The image processing system as set forth in claim 2, wherein the module information includes device information of a device connected to the any other module.

5. The image processing system as set forth in claim 4, wherein when respective module information in each of the plural image processing modules is altered, the altered module information is informed to any other modules via the high speed bus, and
each of the image processing modules informed of the alteration of the module information updates automatically the connection management table therein based on the altered module information.

6. The image processing system as set forth in claim 1, wherein the plurality of image processing modules include at least two modules of:
a first image processing module for applying image processing to image information input from an image information input device thereby creating a first processed image to output to an image information output device;
a second image processing module for applying image processing to image information input from a first external line thereby creating a second processed image to transfer to first image processing module for output to the image information output device; and
a third image processing module for applying image processing to image information input from the image information input device thereby creating a third processed image to transfer to a second external line.

7. The image processing system as set forth in claim 6, wherein the first image processing module includes an exclusive image transfer bus for applying image processing to image information input from the image information input device thereby creating the first processed image to output to the image information output device.

8. The image processing system as set forth in claim 6, wherein the common processing section is provided in the first image processing module when the plurality of image processing modules include the first image processing module.

9. The image processing system as set forth in claim 6, wherein the first external line is connected with at least one of an external equipment and a network.

10. The image processing system as set forth in claim 6, wherein the second external line is connected with at least one of an external equipment and a facsimile line.

11. An image processing system comprising:
a plurality of image processing modules, wherein each image processing module includes a peculiar processing section for executing image processing peculiar to the image processing module; and
a high speed bus for connecting between the plurality of image processing modules, the high speed bus having a command response procedure,
wherein each of the plurality of image processing modules collects module information of any other module connected to the module collecting the module information via the high speed bus to generate a connection management table when the system is started up, and
wherein when each of the plurality of image processing modules requests any other module to execute processing, the module to be requested is determined with reference to the connection management table generated therein.

12. The image processing system as set forth in claim 11, wherein the module information includes device information of a device connected to the any other module.

13. The image processing system as set forth in claim 12, wherein when respective module information in each of the plural image processing modules is altered, the altered module information is informed to any other modules via the high speed bus, and
each of the image processing modules informed of the alteration of the module information updates automatically the connection management table therein based on the altered module information.

14. The image processing system as set forth in claim 11, wherein when respective module information in each of the plural image processing modules is altered, the altered module information is informed to any other modules via the high speed bus, and
each of the image processing modules informed of the alteration of the module information updates automatically the connection management table therein based on the altered module information.

15. The image processing system as set forth in claim 11, wherein the plurality of image processing modules include at least two modules of:
a first image processing module for applying image processing to image information input from an image information input device thereby creating a first processed image to output to an image information output device;
a second image processing module for applying image processing to image information input from a first external line thereby creating a second processed image to transfer to first image processing module for output to the image information output device; and
a third image processing module for applying image processing to image information input from the image information input device thereby creating a third processed image to transfer to a second external line.

16. The image processing system as set forth in claim 15, wherein the first image processing module includes an exclusive image transfer bus for applying image processing to image information input from the image information input device thereby creating the first processed image to output to the image information output device.

17. The image processing system as set forth in claim 15, further comprising:

a common processing section executing image processing common to the plurality of image processing modules, the common processing section provided in at least one of the plurality of image processing modules and shared by the plurality of image processing modules to execute required image processing, wherein:

the common processing section and the peculiar processing sections are provided separately, and the common processing section is provided in the first image processing module when the plurality of image processing modules include the first image processing module.

18. The image processing system as set forth in claim 15, wherein the first external line is connected with at least one of an external equipment and a network.

19. The image processing system as set forth in claim 15, wherein the second external line is connected with at least one of an external equipment and a facsimile line.

* * * * *